O. E. BYRON.
LOCK FOR TRAILER STEERING AND DRAFT GEARS.
APPLICATION FILED DEC. 10, 1920.
1,399,188.
Patented Dec. 6, 1921.
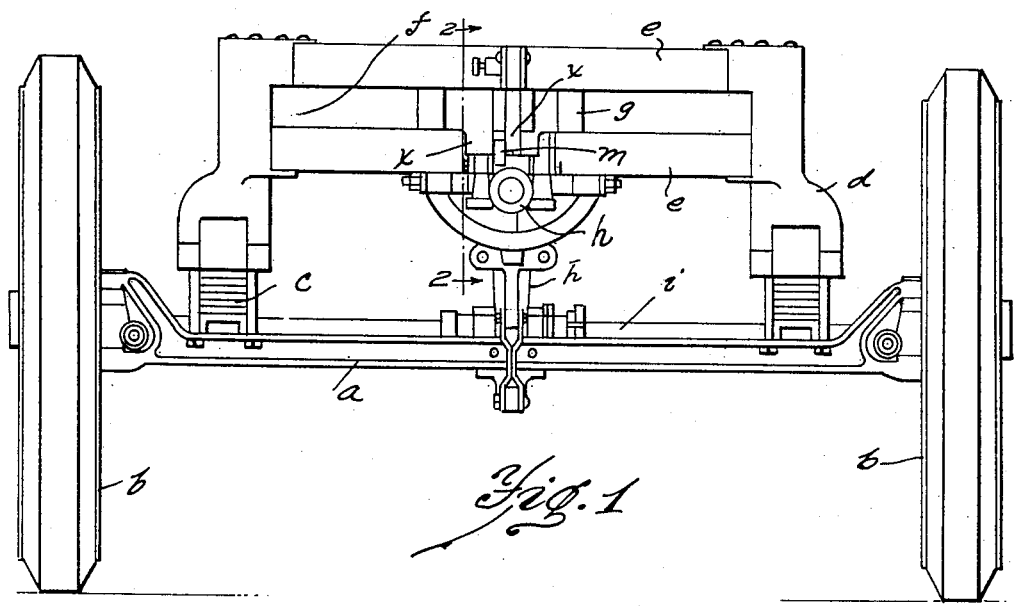
Fig. 1
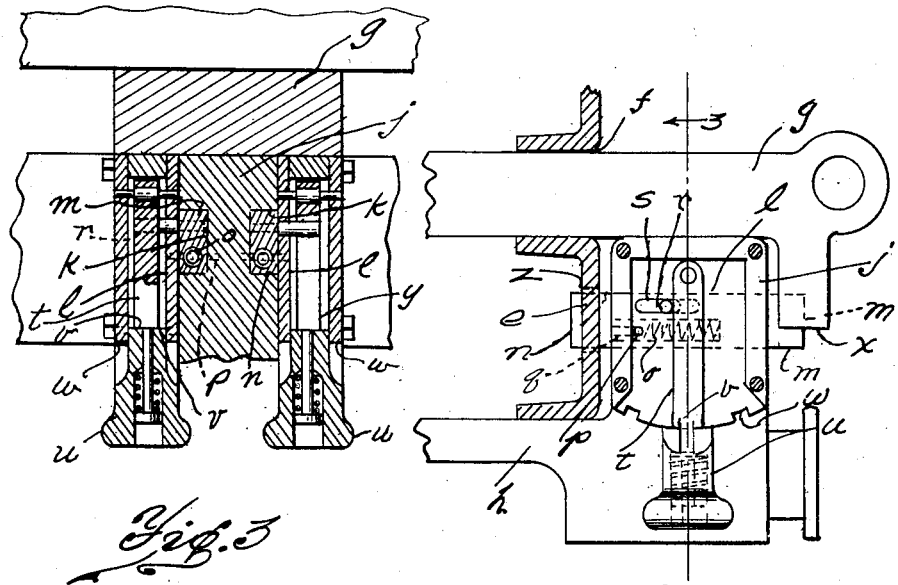
Fig. 3
Fig. 2
INVENTOR.
ORRA E. BYRON.
BY
Stuart C. Barnes
ATTORNEY.

UNITED STATES PATENT OFFICE.

ORRA E. BYRON, OF LOUISVILLE, KENTUCKY.

LOCK FOR TRAILER STEERING AND DRAFT GEARS.

1,399,188.  Specification of Letters Patent.  Patented Dec. 6, 1921.

Application filed December 10, 1920. Serial No. 429,656.

*To all whom it may concern:*

Be it known that I, ORRA E. BYRON, a citizen of the United States, residing at Louisville, in the county of Jefferson and State of Kentucky, have invented certain new and useful Improvements in Locks for Trailer Steering and Draft Gears, of which the following is a specification.

This invention relates to locks for use in connection with trailer steering arms, and has for its object a lock which can be used to engage the steering arm with the draw bar or engage the steering arm with the chassis frame, or engage the steering arm with both the draw bar and the chassis frame, as will presently be described.

In the drawings,—

Figure 1 is a front elevation of a trailer showing same equipped with my improved lock.

Fig. 2 is a fragmentary section taken on the line 2—2 of Fig. 1.

Fig. 3 is a cross section taken on the line 3—3 of Fig. 2.

The axle is designated $a$, the wheels $b$, the springs $c$, the chassis frame $d$. A pair of channel bars $e, e$ are located on the front of the chassis frame and leave an opening $f$ in which swings the draw bar $g$. The steering arm or lever is designated $h$ and is supported to swing on a pivot in a fixed horizontal plane below the draw bar and below the channels $e$. (This pivot is not shown as this is standard trailer construction.) The lower end of this steering arm engages with the distance rod $i$ to steer the wheels. The steering arm $h$ is provided with a head $j$ that rises up from the steering arm in front of the lower channel $e$. This head is formed by an I-beam section extending upwardly from the steering arm $h$, forming a pair of bolt guides $k, k$. These bolt guides in connection with the plates $l$ serve to guide the bolts $m$ and $n$. The bolt $m$ is normally pressed forward by the spring $o$ that engages in a bore in the bolt and against the pin $p$ that passes through a slot $q$ in the bolt and is held in the plate $l$ and in the head $j$. This bolt is provided with a projecting pin $r$ engaging through the slot $s$ in the plate $l$ and against the bolt lever $t$ which is provided with a spring-pressed knob $u$ that has a finger $v$ that engages in the notches of the toothed segment $w$.

Now obviously by pulling down on the knob $u$ the finger $v$ may be pulled out of the notch in the segment and the lever moved to the rear, thereby engaging the pin $r$ and withdrawing the bolt $m$ from in between the forked portions $x$ of the draw bar, consequently disengaging the steering arm from the draw bar so that the steering arm is free to swing clear of the draw bar or the draw bar clear of the steering arm. On the opposite side of the steering arm head $j$ is a construction precisely the same except the bolt is urged in the opposite direction and designated $n$ and the lever $y$. This bolt, however, is arranged to engage through a slot $z$ in the lower channel $e$ of the chassis frame. Consequently the bolt may be withdrawn or allowed to be shot into the recess $z$ for the purpose of freeing the steering arm or locking the steering arm to the chassis frame.

What I claim is:

1. In a trailer, the combination of a chassis frame, a draw bar adapted to swing with respect to the frame, a steering arm adapted to swing with respect to the frame and provided with a head arranged to swing between portions of said draw bar and said frame each containing a bolt recess, the said head having a pair of independently sliding bolts, one arranged to slide into the bolt recess of the frame and the other into the bolt recess of the draw bar, and means for controlling the action of said bolts to engage or disengage the same from the bolt recesses.

2. In a trailer, the combination of a chassis frame provided with a pair of spaced apart frame members at the front, one of the same having a bolt recess therein, a draw bar pivoted to swing on a horizontal plane between the two frame members and having a depending portion spaced apart from the front of the frame members and provided with a bolt recess, a steering arm arranged below the frame members to swing on a horizontal plane and provided with an upwardly-extending head between the frame member and the depending portion of the draw bar, the said lower frame member being provided with a bolt recess and a pair of bolts slidably engaging in the head of the steering arm, and means for controlling the bolts whereby either of the bolts may be engaged in the bolt recesses of the frame and the draw bar or both bolts may be disengaged from the bolt recesses.

3. In a trailer, the combination of a chassis frame provided with a bolt recess, a draw bar arranged to swing with respect to the chassis frame and also provided with a bolt recess, a steering arm provided with a pair of independently sliding bolts provided with spring means tending to shoot them into the bolt recess of the chassis frame and the draw bar, and selective means by which one or both bolts may be withdrawn from the bolt recess and held in such withdrawn position.

4. In a trailer, the combination of a chassis frame provided with a bolt recess, a draw bar arranged to swing with respect to the chassis frame and also provided with a bolt recess, a steering arm provided with a pair of independently sliding bolts provided with spring means tending to shoot them into the bolt recess of the chassis frame and the draw bar, and a pair of independently pivoted levers on the steering arm by which either or both bolts may be withdrawn from the bolt recesses and held in such withdrawn position.

5. In a trailer, the combination of a chassis frame provided with a bolt recess, a draw bar arranged to swing with respect to the chassis frame and also provided with a bolt recess, a steering arm provided with a pair of independently sliding bolts provided with spring means tending to shoot them into the bolt recess of the chassis frame and the draw bar, and a pair of levers secured to the steering arm provided with detent means by which either or both bolts may be withdrawn from the bolt recesses and the levers held in position to retain the bolts in such withdrawn position.

In testimony whereof I affix my signature.

ORRA E. BYRON.